United States Patent [19]

Dexter

[11] Patent Number: 4,689,362
[45] Date of Patent: Aug. 25, 1987

[54] STABILIZED OLEFIN POLYMER INSULATING COMPOSITIONS

[75] Inventor: Martin Dexter, Briarcliff Manor, N.Y.

[73] Assignee: Ciba-Geigy Corporation, Ardsley, N.Y.

[21] Appl. No.: 881,542

[22] Filed: Jul. 2, 1986

[51] Int. Cl.[4] .......................... C08K 5/54; C08L 83/12
[52] U.S. Cl. ............................ 524/266; 174/110 PM; 525/105; 525/106
[58] Field of Search ............... 524/266; 525/106, 105; 174/110 PM, 110 S; 428/391

[56] References Cited

U.S. PATENT DOCUMENTS

| | | | |
|---|---|---|---|
| 2,888,419 | 5/1959 | Safford | 525/106 |
| 2,930,083 | 3/1960 | Vostovich et al. | 525/106 |
| 3,425,983 | 2/1969 | Wolfe | 525/106 |
| 3,956,420 | 5/1976 | Kato et al. | 525/106 |
| 3,979,356 | 9/1976 | Walters | 525/106 |
| 4,341,675 | 7/1982 | Nakamura | 524/266 |
| 4,472,556 | 9/1984 | Lipowitz et al. | 525/106 |
| 4,608,306 | 8/1986 | Vincent | 525/106 |

Primary Examiner—Veronica P. Hoke
Attorney, Agent, or Firm—Harry Falber

[57] ABSTRACT

Insulating material for electric wire and cable which consists of an olefin polymer stabilized against electrical failure resulting from voltage stress by the presence therein of a polydialkylsiloxanepolyoxyalkylene block or graft copolymer, the electric wire coated with said insulating material and a method for stabilizing said insulation.

14 Claims, No Drawings

STABILIZED OLEFIN POLYMER INSULATING COMPOSITIONS

FIELD OF THE INVENTION

This invention relates to novel polymeric compositions having greatly improved resistance to failure when utilized to insulate high voltage conductors. More particularly, it relates to certain polydialkylsiloxanepolyoxyalkylene block and graft copolymers which stabilize said polymeric compositions such as polyethylene, crosslinked polyethylene and similar polyolefin dielectric materials used as insulators for wire against electrical failure at elevated voltages. Additionally, the invention relates to the method of stabilizing wire insulation against dielectric breakdown under voltage stress in wet surroundings utilizing these silane polymers.

BACKGROUND OF THE INVENTION

Polymeric compositions are extensively used as insulation materials for high voltage wire and cable. Olefin homo- and copolymers are the insulation materials of choice for high voltages (5000+ volts) based on desirable electrical and physical properties such as dielectric strength; toughness, such as resistance to cutting and abrasion; ageing characteristics; resilience; and minimal cracking on mechanical stress. Polyethylene, polypropylene and blends thereof polymerized in different densities as well as copolymers thereof with each other and other insulating polymers are usually used.

It has been noted that such polyolefin-based materials when used as insulation materials in high voltage distribution wires and cable are prone to electrical failure including breakdown under voltage stress in wet environments. The latter breakdown may result from a degradation phenomenon identified as "water trees". Under high voltage wet-stress, microscopic channels, i.e. dendritic voids, appear in the insulation. These have a tree-like appearance - hence, the name. Such failure is most disadvantageous. This problem is now aggravated in that many high voltage cables are buried for greater reliability (decrease of damage from high winds, ice storms, etc.) and for aesthetic reasons. Over extended periods of time, short circuits have occurred in such buried cables resulting in loss of service. These cables have to be removed by excavation and replaced, a time consuming and costly operation.

Many classes of chemical compound additives have been disclosed in the prior art as effective voltage stabilizers, i.e. suppressants for electrical failure, water-treeing and/or electrical-treeing (microscopic dentrites caused by corona arcing). These prior art teachings include voltage stabilizers based on silicon derivatives, furfuryloxy phosphites and high-molecular weight polyethylene oxide.

In the prior art, Kowasaki, U.S. Pat. No. 4,305,849, teaches the use of polyethylene glycols having molecular weights of from about 1,000 to 20,000 as voltage stabilizers.

Ashcraft et al in U.S. Pat. Nos. 4,144,202 and 4,263,158 teach the use of organosilane compounds containing azomethine groups as voltage stabilizers.

Turbett et al in U.S. Pat. No. 4,376,180 disclose the use of 3-(N-phenylaminopropyl-tridodecyloxysilane) as a voltage stabilizer.

Turbett in U.S. Pat. No. 4,440,671 discloses the use of a blend of hydrocarbon-substituted diphenyl amine and a high molecular weight polyethylene glycol for this purpose.

Braus et al in U.S. Pat. No. 4,514,535 disclose the use of tritetrahydrofurfuryloxy phosphite as a voltage stabilizer.

Beasley et al in U.S. Pat. No. 4,374,224 disclose the use of an organic carboxylic ester having at least one aromatic ring and at least three carboxylic ester groups as a voltage stabilizer.

U.S. Pat. No. 3,553,348 describes the use of filler minerals such as magnesium silicate, pretreated with alkyl and vinyl alkoxysilanes, as voltage stabilizers.

It will be noted from most of these prior art teachings that previous experimenters have relied upon a test based on microscopic examination of the voltage stressed polymer. The number of "trees" and their length were utilized to judge the resistance deterioration of the insulation. These tests were based on the assumption that "tree" length and the number of trees could be used to approximate the relative useful life of the insulation. These tests, while rapid, are subject to many variables not quite analagous to the actual service conditions.

In contrast, the polymers utilized in this invention and representative compounds of the above mentioned prior art have been tested and compared herein by the use of actual wires coated with the test material compositions. These wires are immersed in a water bath and subjected to high voltage until electrical failure. This test methodology is more closely analagous to the conditions leading to electrical failure of buried distribution cables.

THE INVENTION

This invention is based on the discovery that a group of polydialkylsiloxanepolyoxyalkylene block and graft copolymers, and preferably polydimethylsiloxanepolyoxyethylenes, are capable of effectively stabilizing insulation against high voltage stresses.

The voltage stabilizing materials of this invention correspond to the formulae (I) a "silicone-diol" ABA-type block copolymer having the following structural formula

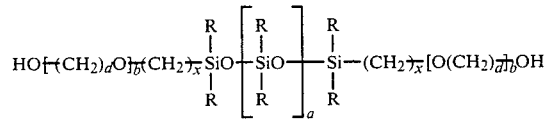

wherein
a is 2–100, and preferably 6–24;
b is 1–100, and preferably 8–30; and
x is 2–8;
d is 2–4; and R is $C_1$–$C_6$ alkyl, and preferably $CH_3$; and (II) a silicone graft copolymer having the structural formula:

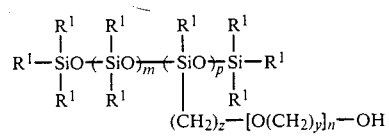

where
m is 2–100, and preferably 3–12;

n is 1–100, and preferably 6–30;

p is 2–4;

z is 2–8;

y is 2–4; and $R^1$ is $C_1$–$C_6$ alkyl, and preferably $CH_3$.

Upon testing, as detailed below, these polymers when incorporated into wire insulations provide excellent voltage stabilizing activity against electrical failure, particularly in a wet environment.

Some of the voltage stabilizers that form the basis of this invention are commercially available.

Compound I, a polydimethylsiloxanepolyoxyethylene block polymer is marketed by Dow-Corning Inc. as Fluid Q4-3667. As the product is prepared to process specification, the values for $a = \sim 15$ and $b = \sim 12$ are best recited as approximations. The a and b values of the commercial materials are $\pm 2$ of the nominal values recited above. The x value for this polymer is 3, d is 2 and R is $CH_3$.

Compound II, a graft co-polymer is marketed by Dow-Corning, Inc. as Surfactant 193. The numerical values of $m = \sim 6$, $n = \sim 13$ and $p = \sim 3$ are, in the commercial material, also approximations with a variable of $\pm 2$ as with the above mentioned product. The z value for this copolymer is 3, y is 2 and $R^1$ is $CH_3$.

Other commercially available materials include Dow Corning 1248 Fluid, Dow Corning XF4-3557 Fluid, and Dow Corning Q2-8026 Fluid. These materials are frequently characterized as polydimethylsiloxanes containing alcohol functions grafted onto the siloxane chain. Such materials are described in greater detail in U.S. Pat. No. 4,130,708, the disclosure of which is incorporated herein by reference.

As previously noted, the insulation materials are olefin polymers. Such olefin polymers include low and high density polyethylene; polypropylene; ethylenepropylene copolymers; polybutene; polyisobutylene; copolymers of ethylene and diene monomers such as butadiene, isoprene and the like; terpolymers of ethylene, propylene and diene monomers; copolymers of ethylene and other α-olefins such as butylene and octylene; copolymers of ethylene and vinyl monomers such as vinyl acetate, ethyl acrylate and methyl methacrylate; and blends of polyethylene with polyvinyl acetate, ethylene-propylene copolymer and polyhydroxyethylacrylate. These olefin polymers can also be crosslinked. Crosslinking agents are well known to those skilled in the art and can include for example, organic peroxides. High and low density polyethylene and crosslinked low density polyethylene are preferred for use in this invention.

The stabilizing materials of this invention have proven effective when incorporated into polyolefin insulating materials in amounts ranging from 0.1% to 5.0% by weight, and preferably 0.3 to 3.0%. Used within this range and adjusted in concentration by relative activity they are effective and economical for the indicated area of utility.

The compositions of this invention can also contain antioxidants such as sterically hindered phenols, aromatic amines, polymerized 2,2,4-tetramethylhydroquinoline, 4,4'-thio-bis(3-methyl-6-tert-butylphenol), thiodiethylene-bis(3,5-di-tert-butyl-4-hydroxy)hydrocinnamate, distearylthiodipropionate, and the like. In addition, materials commonly added to olefin polymer compositions to be used in electrical applications can also be used herein.

Preparation of the stabilized insulation (utilizing low density polyethylene as an example) generally proceeds according to the following scheme:

A 1000 gram amount of low density polyethylene (Exxon LD 113.09) is fluxed in a water cooled Banbury mill (temperature not to exceed about 105° C.). To the fluxed polyethylene is added 2 gm of thiodiethylene bis-(3,5-di-tert-butyl-4-hydroxy)hydrocinnamate, 3 gm of di-octadecylthiodipropionate, 20 gm of dicumyl peroxide and 10 gm (1.0%) of the specified voltage stabilizer. After the formulation is thoroughly mixed, it is removed from the Banbury mill while still hot ($\sim 100°$–$110°$ C.) and rolled into sheets on a two-roll mill at a temperature between 100°–105° C. The sheets are cooled and then chopped into granules.

PREPARATION OF INSULATED WIRE

The granules of stabilized polymer are extruded over a #14 gauge ($64 \times 64$ mil) square copper wire using a round die. The outer diameter of the insulation is 124 mil. The polymer is crosslinked by heating the coated wire in a steam vulcanizing tube at 250 pounds steam pressure for two minutes. At the end of the two minute heating period, the wire is cooled in water under a pressure of 250 pounds.

TESTING THE WIRE

Volatile products such as acetophenone are removed from the insulated wire by baking the wire for 3 weeks at about 80° C. For each insulated wire formulation being tested, ten$\times$30 centimeter lengths of the baked, insulated wire as prepared above, are placed in a 50° C. water bath. A potential difference of 7500 volts 60 $H_z$ is applied between the conductor and the water bath. At failure, the insulation of the wire is perforated permitting water to contact the conductor, causing a short circuit, indicating failure. The time required for the failure of the fifth sample is recorded as the failure time for the series of the ten insulated wires.

These procedures are then utilized to test various stabilizers:

Compound A (U.S. Pat. No. 4,305,849 to Kowasaki et al) is a polyethylene glycol with an approximate molecular weight of about 15,000. It is a commercial material supplied by Union Carbide Corporation as Polyethylene Glycol 20 M. U.S. Pat. No. 4,305,849, claims this material as a voltage stabilizer.

Compound B (U.S. Pat. No. 4,263,158 to Ashcraft et al) is prepared by a procedure described in Example 21 of U.S. Pat. No. 4,263,158. Equimolar quantities of γ-aminopropyltrimethoxy silane and benzaldehyde are reacted to yield a condensation product. This product is disclosed as a highly effective voltage stabilizer.

Compound C (U.S. Pat. No. 4,376,180 to Turbett et al) is 3-(N-phenylaminopropyl-tridodecyloxysilane) as prepared by the procedure disclosed in U.S. Pat. No. 4,376,180.

Compound D reflecting the instant invention is Dow Corning Q4-3667.

Compound E reflecting the instant invention is Dow Corning Surfactant 193.

The results obtained are as follows:

| Stabilizer | Hours to Failure |
| --- | --- |
| Control (no stabilizer) | 181 |
| A | 466 |
| B | 611 |

| Stabilizer | Hours to Failure |
| --- | --- |
| C | 159 |
| D | 2514 |
| E | 1899 |

From the above it can be seen that the polymers of this invention provide excellent protection against electrical failure as compared to the unstabilized control and the prior art discussed above.

Other structurally related silicone-glycol copolymers are commercially available (noted hereinabove) and can be expected to exhibit similar stabilizing activity. The above exemplified voltage stabilizer materials are, however, an indication of the preferred compounds among those commercially available silicones. Thus, the structurally-related and commercially available equivalents of these polymers are considered within the ambit of this invention.

Summarizing, it is seen that this invention provides silicone-containing polymeric compositions for use as effective voltage stabilizers in insulation for wire and cable. Variations may be made in proportions, procedures and materials without departing from the scope of the invention as defined by the following claims.

I claim:

1. An electrical insulation composition consisting essentially of an olefin polymer and an effective voltage stabilizing amount of a polydialkylsiloxanepolyoxyalkylene polymer corresponding to the formulae:

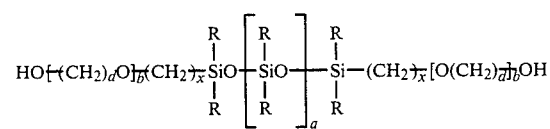

wherein a is 2–100, b is 1–100, x is 2–8, d is 2–4 and R is $C_1$–$C_6$ alkyl; and

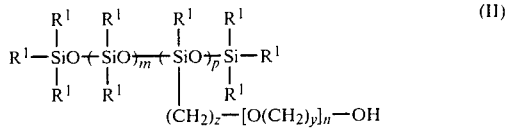

where m is 2–100, n is 1–100, p is 2–4, z is 2–8, y is 2–4 and $R^1$ is $C_1$–$C_6$ alkyl.

2. The composition of claim 1 containing a polymer of formula I.

3. The composition of claim 1 containing a polymer of formula II.

4. The composition of claim 2, wherein a is 6–24 and b is 8–30.

5. The composition of claim 4, wherein a is 15±2, each b is 12±2, each x is 3, each d is 2 and each R is $CH_3$.

6. The composition of claim 3, wherein m is 3–12 and n is 6–30.

7. The composition of claim 6, wherein m is 6±2, n is 13±2, p is 3±2, z is 3, y is 2 and each $R^1$ is $CH_3$.

8. The composition of claim 1, wherein said siloxane polymer is present in a concentration ranging from about 0.1%–5.0%, by weight.

9. The composition of claim 1, wherein said olefin polymer is selected from the group consisting of low and high density polyethylene, polypropylene, polybutene, polyisobutylene, copolymers of ethylene and α-olefins, copolymers of ethylene and diene monomers, copolymers of ethylene and vinyl monomers, polyethylene/polyvinyl acetate blend, polyethylene/ethylene-propylene copolymer blend, polyethylene/polyhydroxyethyl acrylate blend and the crosslinked olefin variations thereof.

10. The composition of claim 9, wherein said olefin polymer is high density polyethylene, low density polyethylene or crosslinked low density polyethylene.

11. The composition of claim 9 which contains an organic peroxide crosslinking agent.

12. The composition of claim 1 which also contains a sterically hindered phenol or amine antioxidant.

13. Electric wire or cable insulated with the electrical insulation composition of claim 1.

14. A method of stabilizing an insulating olefin polymer against electrical failure which comprises incorporating therein an effective stabilizing amount of the polydialkylsiloxanepolyoxyalkylene polymer of claim 1.

* * * * *